United States Patent
Song

(10) Patent No.: US 6,721,321 B1
(45) Date of Patent: Apr. 13, 2004

(54) DATA COMMUNICATION CHANNEL PROCESSING APPARATUS FOR TRANSMITTER, PROTOCOL STACK STRUCTURE AND OPERATING METHOD THEREFOR

(75) Inventor: In-Kwang Song, Yong-in-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/475,689

(22) Filed: Dec. 30, 1999

(30) Foreign Application Priority Data

Dec. 30, 1998 (KR) .............................. 98-60979

(51) Int. Cl.[7] .......................................... G06F 15/167
(52) U.S. Cl. ...................... 370/392; 709/216; 709/312
(58) Field of Search ................................ 370/903, 907, 370/392; 709/212, 312, 321, 213–215, 208, 211, 200, 203, 209, 216, 230, 227, 237

(56) References Cited

U.S. PATENT DOCUMENTS

| | | | | |
|---|---|---|---|---|
| 5,329,579 A | * | 7/1994 | Brunson | 379/88.26 |
| 5,461,624 A | * | 10/1995 | Mazzola | 370/402 |
| 5,488,693 A | * | 1/1996 | Houck et al. | 709/208 |
| 5,734,830 A | * | 3/1998 | Balogh et al. | 709/208 |
| 5,991,819 A | * | 11/1999 | Young | 709/253 |
| 6,112,230 A | * | 8/2000 | Monch et al. | 709/208 |
| 6,195,688 B1 | * | 2/2001 | Caldwell et al. | 709/208 |
| 6,393,026 B1 | * | 5/2002 | Irwin | 370/401 |
| 6,426,947 B1 | * | 7/2002 | Banker et al. | 370/254 |

FOREIGN PATENT DOCUMENTS

| WO | WO 98/02993 | 2/1998 | .......... H04L/12/24 |
|---|---|---|---|

* cited by examiner

Primary Examiner—Chi Pham
Assistant Examiner—Andrew M. Waxman
(74) Attorney, Agent, or Firm—Cha & Reiter, L.L.C.

(57) ABSTRACT

A method for constructing a protocol stack of a data channel processor in a transmitter, in which the protocol stack includes: an application layer having a common management interface protocol (CMIP), a remote operation service element (ROSE), and an association control service element (ACSE); a presentation layer having an abstract syntax notion 1 (ASN.1) associated with a statement of an employed language; a session layer using an X.225 standard; a transport layer for data communication; a network layer conducting a routing; and the first to the eighteenth subnets for communicating data. Here, the first and the second subnets communicate the data with a system in the first and the second directions opposite each other, and the remainder subnets communicate the data with slave processors through a DPRAM.

13 Claims, 6 Drawing Sheets

DATA COMMUNICATION CHANNEL PROCESSING APPARATUS FOR TRANSMITTER, PROTOCOL STACK STRUCTURE AND OPERATING METHOD THEREFOR

CLAIM OF PRIORITY

This application makes reference to, incorporates the same herein, and claims all benefits accruing under 35 U.S.C. Section 119 from an application for DATA COMMUNICATION CHANNEL PROCESSING APPARATUS FOR TRANSMITTER, PROTOCOL STACK STRUCTURE AND OPERATING METHOD OF THE SAME filed in the Korean Industrial Property Office on Feb. 30, 1998 and duly assigned Serial No. 98-60979.

BACKGROUND OF THE INVENTION

1. Field of the Invention

The present invention generally relates to a transmitter and method thereof for the transmission of data signals over a transmission line, and more particularly, to a protocol stack for providing data communication between communication application entities.

2. Description of the Related Art

Generally, a transmitter refers to as an apparatus for linking two transmitters or for linking a switching system to a subscriber. Such transmitter is mainly classified into two types: a radio transmitter and a cable transmitter. There are numerous types of cable transmitters such as optical transmitters used to transmit and receive the optical signals. The optical transmitters provide data link connection through optical links between two transmitters, a switching system and a transmitter, or a transmitter and a plurality of subscribers. These types of optical transmitters using the optical links communicate the data through data communication channel (DCC). Now, reference will be made as to the optical transmitter in connection with FIG. 1.

A transmitter 10 is linked to another transmitter 20 via an optical link. Data are processed by the data channel processors 11 and 21 provided in the transmitters 10 and 20, respectively, and communicated between the transmitters 10 and 20. As these two transmitters have the same construction, a description will be made depicting only the transmitter 10 as an illustrative example. First, the data channel processor 11 having a plurality of slave processors 12a, 12b, . . . , and 12n coupled thereto in the lower application layer controls the traffic flow of the data communication to and from another data channel processor 21 as well as the slave processors 12a, 12b, . . . , and 12n. The type and the number of the slave processors are dependent on the processing capacity of the transmitter 10. For example, a 2.5 Gbps transmitter would have four slave processors and the processing rate for each slave processor would be 622 Mbps. These slave processors are further linked to other information processing equipment or subscriber via optical links. The slave processors are usually linked to the data channel processor 11 through Ethernet. The data channel processor 11 of the transmitter 10 is provided with a protocol stack module that specify the physical media, the manner, and the process for conducting the data communication. Each of the slave processors 12a, 12b, . . . , and 12n is also provided with its own protocol stack. A description will be made below with reference to FIG. 2 as to the protocol stacks of the data channel processor 11 and the slave processors 12a, 12b, . . . , and 12n.

The data channel processor 11 has a protocol stack of a seven-layer model as set forth in the OSI (Open System Interconnection) Basic Reference Model. More specifically, the data channel processor 11 includes an application layer 31 as the highest layer which contains a CMIP (Common Management Interface Protocol) for exchanging data between the application entities, an ROSE (Remote Operation Service Element) for a remote operation service by providing request/reply transaction in situations where a long-term association between the application entities is required, and an ACSE (Association Control Service Element) for transporting Call Detail Records to a centralized administrative center.

The lower layers of the application layer 31 are as follows. A presentation layer 32 has an ASN.1 (Abstract Syntax Notion 1) associated with the statement of a language used. The syntax is only concerned with the representation of the data and not the meaning to the application layer. A session layer 33 employs an X.225 standard for managing the data exchange between the application entities. A transport layer 34 serves to control the transfer of data between the entities, and a network layer 35 serves to perform the routing process to establish, maintain, and terminate the network connection. A data link layer 36 is divided into one section using an LAPD (Link Access Procedure of D-channel) and another section for an LLC1 section. The LLC1 section is linked to the slave processors for the data processing function. The LAPD section is further divided into a first subnet for data communication in the east direction of the data channel processor 11 and a second subnet for data communication in the west direction of the data channel processor 11. Accordingly, the data link layer 36 provides functional and procedural means to establish, maintain, and release the data link connections among network entities. Lastly, a physical layer 37,which is the lowest layer, has a section for the east/west data processing through optical links, and 10 Base 2 Ethernet is provided therein for data communication. The physical layer 37 is mostly a hardware dependent layer in OSI which provides mechanical, electrical, functional and procedural means to activate, maintain and de-activate a physical connection for data transmission between data link entities.

The individual slave processors 12a to 12n include a network layer 41, a data link layer 42, and a physical layer 43. The data link layer 42 is divided into two sections, LAPD and LLC1. The configuration of the data link layer 42 is similar to the data link layer 36 of the data channel processor 11. In the case that a 2.5 Gbps optical transmitter is employed, the LAPD would have one slave DCC and four subnets, each with 622 Mbps processing capability, and coupled to different information processing units.

As illustrated in the foregoing, each of the slave processors in a transmitter includes the OSI 7-layer protocol stack. However, such implementation has disadvantages in that the software cost rises as each slave processor incorporates its own protocol stack. That is, the cost increases as more protocol stacks are added to the system. Also, as each of the data channel processor and the slave processors is provided with its own protocol stack module in a given transmitter, the transmitter with one node has to have two network service access points (NASPs). This makes an operator or the system to perform the unnecessary functions by assigning two network service access points to one node. The two network access points assigned to one node causes the system to have different addresses depending on which data channel processor and slave processor is connected to the node. As a result, the operator experienced more hardship and confusion in managing and maintaining such system. Furthermore, as two different addresses are assigned to one node and the structure is formed as if one node occupies two nodes, it leads to an increase in the number of nodes of the network, which in turn increases the load of the network. This is because the respective protocol stacks have to exchange a large amount of data mutually while communicating the different routing information, and the increase in the number of nodes requires more data to be processed, thereby increasing the load of the network.

Moreover, as more software is implemented than necessary in each of the slave processors, more man power and more time is consumed in developing new programs. Further, the manufacturing cost of the system device is increased as more memory in the system devices, such as DRAM, SRAM of FROM, for the development of the programs is needed. Furthermore, the data channel processor is linked to the slave processors via Ethernet, which is the same network as that used by a graphic user interface (GUI) for providing the interface between a network management subsystem (NMS) and an operator. As the system experience heavy load owing to the data communication between two processors, the system experience more load on the system when using GUI or NMS.

As described above, using the OSI 7-layer protocol stacks separately in both the data channel processor and the slave processors of the transmitter causes the following problems: (1) the cost of software is increased; (2) it is difficult to manage the addresses since two addresses are assigned to one node; (3) one node is operated in the same manner as having two nodes to increase the load to the system; (4) a lot of software requirements in the slave processors demand more hardware, i.e. memories, thereby increasing the manufacturing cost of the system devices; and, (5) the network experiences an increase in the load of the system and thereby restricted to use limited services.

SUMMARY OF THE INVENTION

It is, therefore, an object of the present invention to provide a low-cost data communication channel processing device not limiting other services and not assigning two addresses to one node by constructing a protocol stack only in the data channel processor, and a method for operating the data communication processing device.

To achieve the above object of the present invention, there is provided a method for constructing a protocol stack of a data channel processor in a transmitter, the protocol stack comprising an application layer having a common management interface protocol (CMIP), a remote operation service element (ROSE), and an association control service element (ACSE); a presentation layer having an abstract syntax notion 1 (ASN.1) associated with the statement of an employed language; a session layer using an X.225 standard for managing data exchange; a transport layer for transferring data; a network layer for conducting a routing function; and, a plurality of subnets for communicating the data. Here, the plurality of subnets includes the first and the second subnets which serve to communicate the data with the system in the first and the second directions opposite each other, and the remaining subnets serve to communicate the data with the slave processors.

In another aspect of the present invention, there is provided a data communication channel processing apparatus for a transmitter comprising a data channel processor having a protocol stack for communicating the data with slave processors through a DPRAM (Dual Port Random Access Memory); the slave processors including tasks for recording the data received via an optical link in the DPRAM, reading the data from the DPRAM, and outputting the data to the optical link; and, the DPRAM for recording the data output from the slave processors or the data channel processor and communicating the data between the slave processors and the data channel processor.

Another object of the present invention is to provide a computer-readable memory medium for storing computer-executable process steps in a data channel processor to process data between the data channel processor and a plurality of slave processors, wherein the medium includes an accessing step and a driving step, the computer-executable process steps comprising: (1) the accessing step comprising the steps of: a generating step for outputting a provision signal prior to data transmission to the driving step to set the driving step in a receiving mode; a downward processing step that activates, maintains, and de-activates a physical connection for the data transmission to the slave processors; and, an upward processing step that activates, maintains, and de-activates a physical connection for the data transmission to the data channel processor; (2) the driving step comprising the steps of: a transmitting step for transmitting the data to another data channel processor; a downward driving step for receiving the data from the downward processing step and for recording the received data in a Dual Port Random Access Memory (DPRAM); and, an upward driving step for reading the recorded data from the DPRAM and outputting the read data to the upward processing step.

A further object of the present invention is to provide a computer-readable memory medium for storing computer-executable process steps in a plurality of slave processors coupled to other devices via a plurality of optical links to process data between a data channel processor and the slave processors, the computer-executable process steps comprising: an inputting step for reading the data transmitted from the data channel processor and stored in a Dual Port Random Access Memory (DPRAM) during a downward processing mode; a distributing step for transmitting the read data from the DPRAM to corresponding the other devices via the slave processors during the downward processing mode; a collecting step for combining the data received from the other devices via the plurality of the optical links and for storing the combined data in the DPRAM during an upward processing mode; an outputting step for outputting the combined data stored in the DPRAM to transmit the combined data to the channel data processor during the upward processing mode; and, a synchronizing step for matching the configuration between the inputting step and the outputting step so that the execution of the outputting step can perform synchronously with the inputting step.

A BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described below with reference to the accompanying drawings. For the purpose of clarity, well-known functions or constructions are not described in detail since they would obscure the invention with unnecessary detail.

First, a description will be made with reference to FIG. 1 to illustrate the modified structure of a transmitter in accordance with the present invention.

Figure 1:
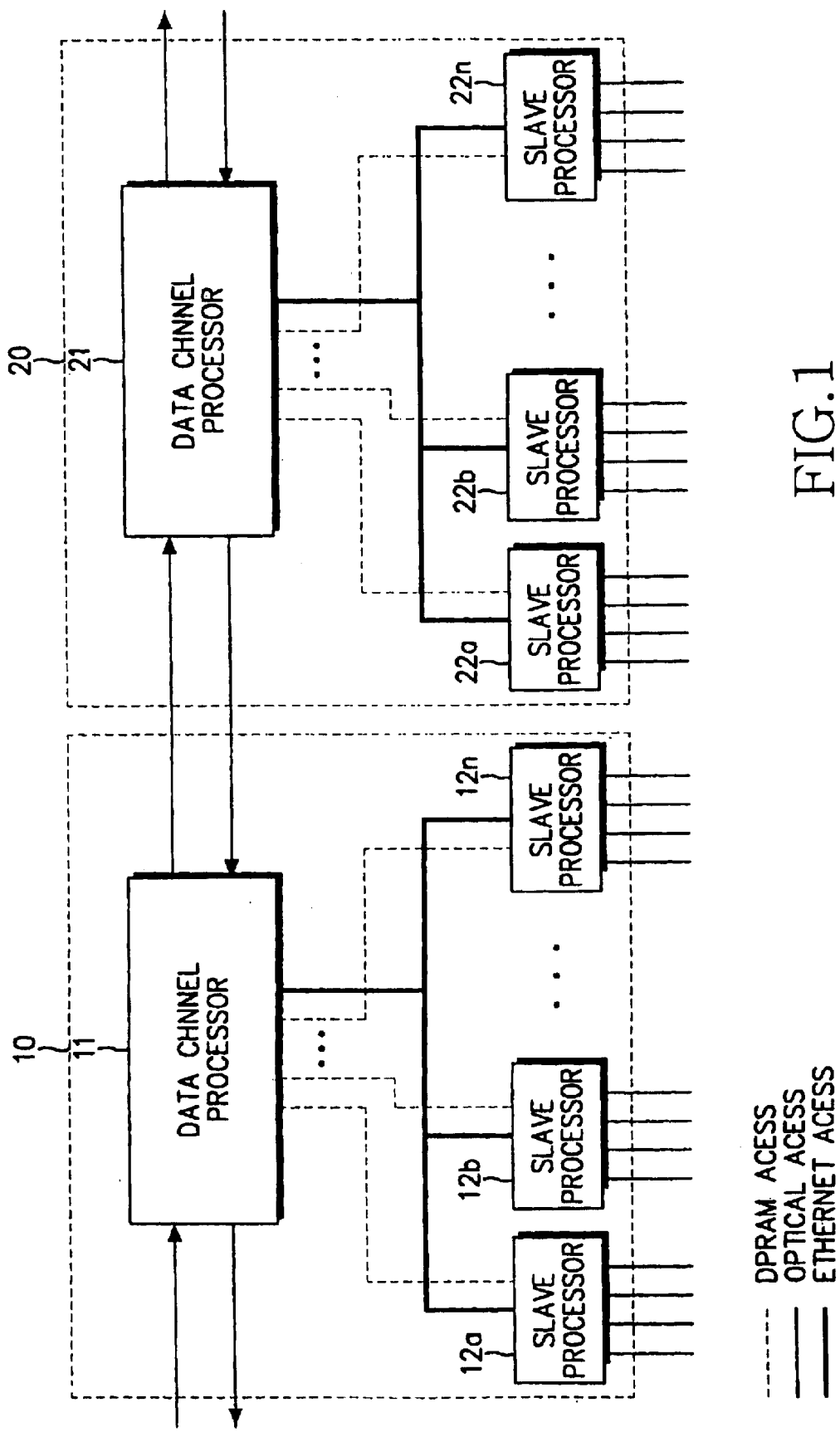
FIG. 1 is a block diagram illustrating the structure of a data communication channel (DCC) in a transmitter.

Referring to FIGS. 1, a transmitter 10 is linked to a second transmitter 20 via an optical link. The transmitter 10 has a data channel processor 11 for performing the east or west data communication through the optical link and a plurality of slave processors 12a, 12b, . . . , and 12n linked in the lower layer of the data channel processor 11. These slave processors 12a, 12b, . . . , and 12n are also linked to other information processing equipment or subscribers through the optical link. Assuming that the optical transmitter is the 2.5 Gbps transmitter, the transmitter would include four optical processors each with a transmission rate of 622 Mbps.

The data channel processor 11 in accordance with the embodiment of the present invention is linked to the respective slave processors 12a, 12b, . . . , and 12n through a Dual Port Random Access Memory (DPRAM). That is, the present invention is differently constructed from the prior art in that the DPRAM replaces the Ethernet linking the data channel processor 11 to the respective slave processors 12a, 12b, . . . , and 12n. However, it should be noted that the communication according to the present invention can be also performed through the Ethernet as well as the DPRAM.

Accordingly, for data transmission from the data channel processor 11 to the respective slave processors 12a, 12b, . . . , and 12n, the data channel processor 11 records the data in the transmission area of the transmit DPRAM and the corresponding slave processors read the recorded data from the transmission area. Similarly, in the event that the data is transmitted from the respective slave processors 12a, 12b, . . . , and 12n to the data channel processor 11, the respective slave processors record the data in the transmission area of the DPRAM and the data channel processor 11 reads the recorded data from the transmission area. Using the DPRAM as foregoing, the data can be communicated between the data channel processor 11 and the respective slave processors 12a, 12b, . . . , and 12n, instead of the Ethernet connection. However, as mentioned earlier, the data channel processor 11 can be linked to the respective slave processors 12a, 12b, . . . , and 12n through Ethernet, instead of the DPRAM according to the preferred embodiment of the present invention.

Figure 2:
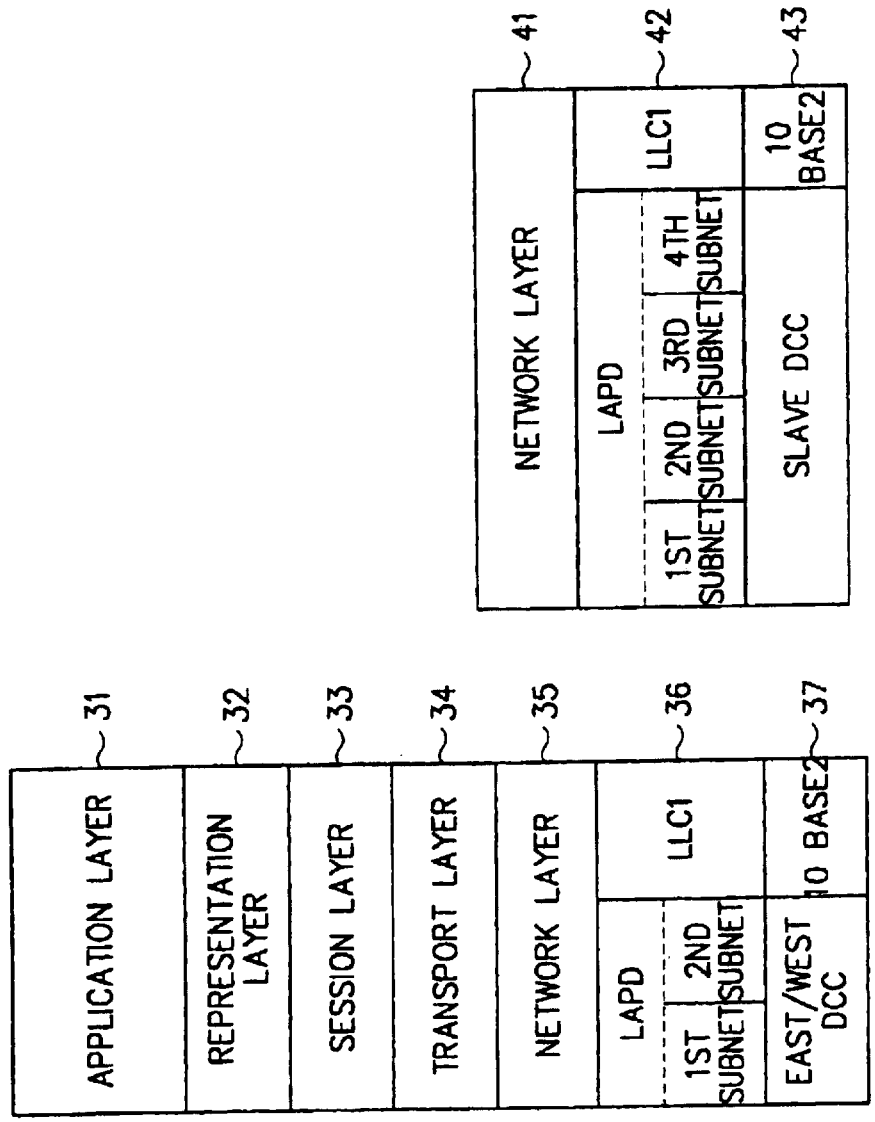
FIG. 2 is a schematic diagram of protocol stacks installed in a data channel processor and a slave processor.

Another distinguishable embodiment of the data channel processor 11 of the present invention in comparison to the prior art is the structure of the lower layer of the OSI 7-layer protocol stack in the data channel processor. In addition, the respective slave processors 12a, 12b, . . . , and 12n is equipped with a driver alone for the Ethernet or the DPRAM, instead of the OSI 7-layer protocol stack as shown in FIG. 2. The driver relates to a driver for the LAPD processing and for the communication between the data channel processor and the slave processor.

Figure 3:
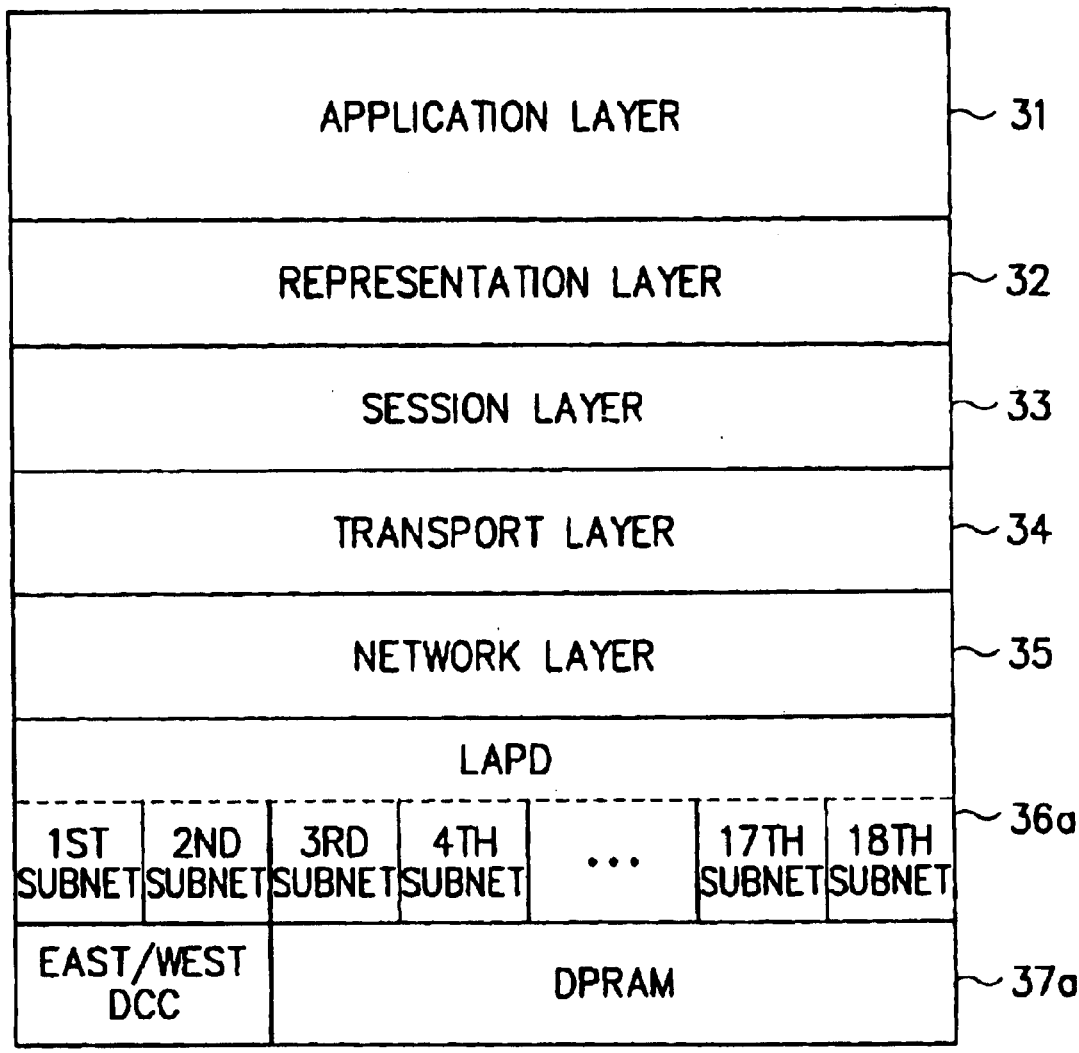
FIG. 3 is a schematic diagram illustrating an OSI 7-layer protocol stack applied to the data channel processor of the transmitter according to the present invention.

FIG. 3 is an illustrative diagram of the OSI 7-layer protocol stack applied to the data channel processor of the transmitter according to the present invention. In the following description, it is assumed that the data channel processor 11 is linked to the respective slave processors 12a, 12b, . . . , and 12n via the DPRAM and the transmitter is the 2.5 Gbps transmitter.

Now, a description will be made as to the OSI 7-layer protocol stack provided in the data channel processor 11 of the transmitter 10 according to the present invention.

Referring to FIG. 3, an application layer 31, being the uppermost layer, includes a CMIP (Common Management Interface Protocol) for communication service, an ROSE (Remote Operation Service Element) for a remote operation service, and an ACSE (Association Control Service Element). The lower layers of the application layer 31 include a presentation layer 32 which has an ASN.1 (Abstract Syntax Notion 1) associated with the statement of the language used herein; a session layer 33 for employing the X.225 standard for managing the data exchange; a transport layer 34 for transporting the data between the entities; and, a network layer 35 serving to perform the routing function. Accordingly, the above-mentioned functions are the same as those of the related art. However, the modified layers of the present invention will be described in detail as follows.

All the subnets belonging to the data link layer 36a are linked through the LAPD driver. In the case where the transmitter is provided with the 2.5 Gbps transmitter, the 2.5 G-transmitter is provided with eighteen subnets, as shown in FIG. 3. Similar to prior art, the first and second subnets serve to control the data communication to from another transmitter through the optical links in the east or west direction. The 2.5 G-transmitter 10 includes four slave processors, and each of the slave processors provided in the lower layer of the 2.5 G-transmitter 10 is matched with four subnets. That is, the first slave processor 12a is matched with the third to the sixth subnets, the second slave processor 12b the seventh to tenth subnets, the third slave processor 12c the eleventh to fourteenth subnets, and the fourth slave processor 12d the fifteenth to eighteenth subnets. However, there is no particular limitation on the order of matching as long as each of the slave processors is matched with four subnets.

The physical layer 37a is divided into two sections - one section for processing the data in the east or west direction through an optical link and the other section is coupled to the DPRAM. The first and second subnets are linked via the east or the west optical link as in prior art. However, the third to eighteenth subnets serve to communicate the data with the respective slave processors through the DPRAM. Due to such structure, it is required that configuration information on the subnets is stored in the memory of the data channel processor 11. That is, there exists a configuration stored in the internal or a separate memory of the data channel processor 11. In the prior art, the configuration information—for example, the information about whether the subnets are in use- of the subnets connected to each slave processor was inputted to each slave processor for its individual management purpose. But in the present invention, the configuration information of all the subnets is inputted to the data channel processor so that the data processor can manage the relevant information for all the subnets. Next, a description will be made as to the construction of software installed in the data channel processor of the transmitter according to the data link layer and the physical layer.

Figure 4:
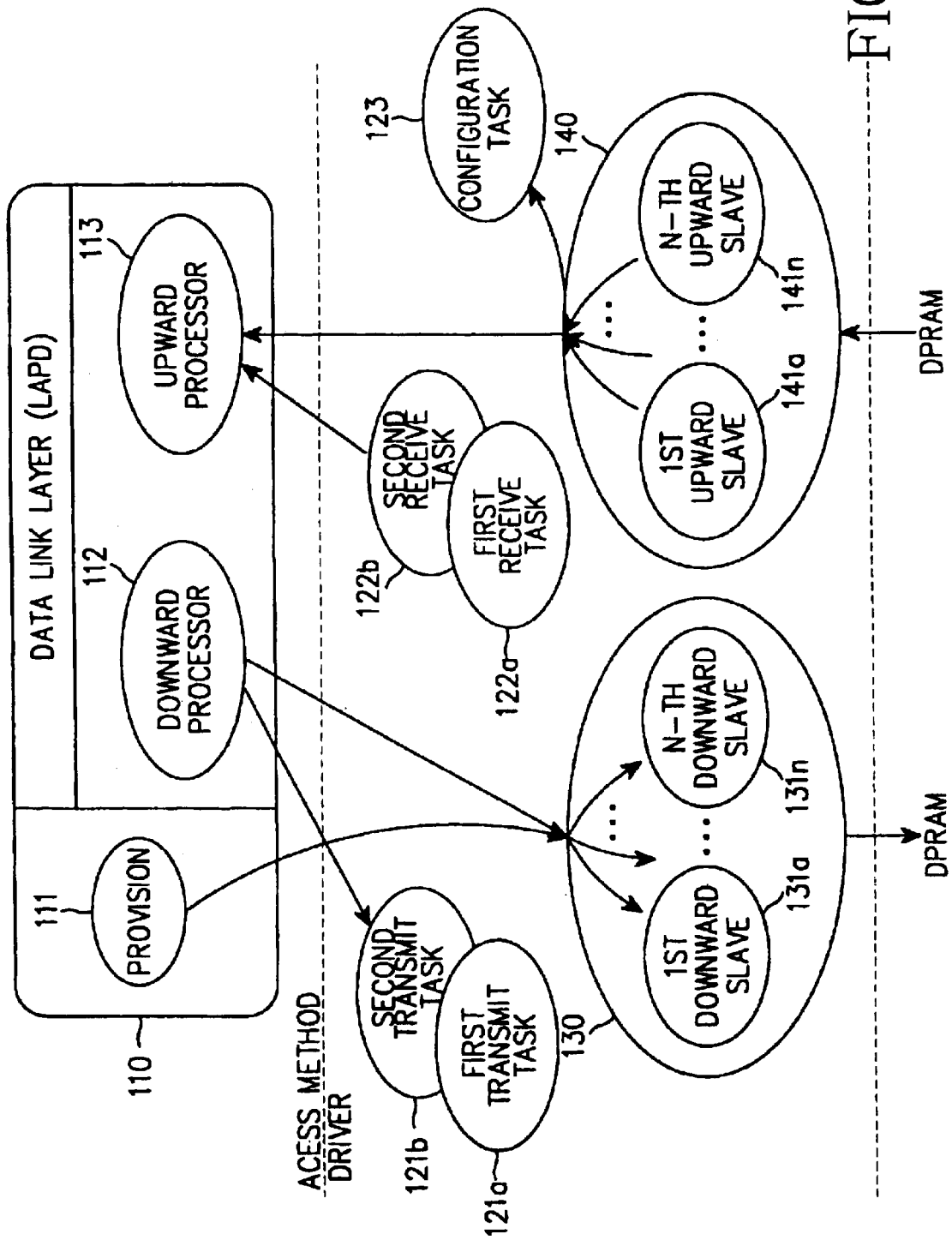
FIG. 4 is a schematic diagram illustrating the structure of software installed in the data channel processor of the transmitter according to the present invention.

FIG. 4 is an illustrative diagram of the software installed in the data channel processor of the transmitter according to the present invention. Now, a detailed description will be made with reference to FIG. 4 regarding the construction of the software installed in the data channel processor of the transmitter.

The construction of the software installed in the data channel processor is divided into three sections: an access method section, a driver section, and a section for writing/reading in/from the DPRAM.

In the access method section, a provision 111 generates a provision signal to the driver section. A downward processor 112 processes the data according to the LAPD protocol of the data link layer 36a and outputs the processed data to the driver section. For processing the data, the downward processor 112 includes LAPD_open/LAPD_close for opening/closing a file, LAPD_on/LAPD_off for using/ending the file, and LAPD_down for processing the file downward. That is, the downward processor serves to activate, maintain, and de-activate physical connection for the data transmission between the application entities. A upward processor 113 processes the data received from the driver section and includes LAPD_read_task for reading the data upwardly processed.

In the driver section, the first and the second transmit tasks 121a and 121b transmit the data output from the downward processor 112 of the access method section to another transmitter. Namely, the first and second transmit tasks 121a and 121b transmit the data to another transmitter in either the east or the west direction. In the case where the first transmit task 121a transmits the data to the east transmitter, the second transmit task 121b transmits the data to the west transmitter. In the case where the first transmit task 121a transmits data to the west transmitter, the second transmit task 121b transmits the data to the east transmitter. The first and second transmit tasks 121a and 121b are LAPD drivers that are conventionally used in the transmitter for sending the data in the opposite direction to each other. Similarly, the first and the second receive tasks 122a and 122b serve to process the data received from either the east or the west transmitter. In the same manner as in the first and the second transmits tasks 121a and 121b, the first and the second receive tasks 122a and 122b process the data received from only one transmitter to another.

According to the present invention, the driver section also includes a downward driver 130 for generating the data received from the data link layer 36a to the respective slave processors via the DPRAM, and an upward driver 140 for generating data to the upward processor 113 of the data link layer 36a via the DPRAM. The downward driver 130 is internally provided with downward slave parts 131a, 131b, . . . , and 131n corresponding to the respective slave processors 121a, 121b, . . . , and 121n, respectively. In a 2.5 G-transmitter, for example, the downward driver 130 includes the first to the fourth downward slave parts 131a, 131b, 131c and 131d. The downward slave parts correspond to the slave processors on a one-to-one basis for transmitting the data. The upward driver 140 reads the data from the DPRAM and outputs the read-out data to the upward processor 113 of the data link layer 36a. Also, the upward driver 140 is internally provided with the upward slave parts corresponding to the respective slave processors in a one-to-one basis. In a 2.5 GHz transmitter, for example, the upward driver 140 includes the first to the fourth upward slave parts 141a, 141b, 141c and 141d. The upward driver 140 collects all the data received from the DPRAM and outputs the read data to the upward processor 113 of the data link layer 36a. The configuration task 123 receives the information concerning the structure of the software from the upward driver 140.

Next, reference will be made to a description of an operation according to the structure of FIG. 4. In the case of the data transmission to another transmitter, the downward processor 112 outputs the data to the first and the second transmit tasks 121a and 121b. To receive data from another transmitter, the first and the second receive tasks 122a and 122b receive the data and output the received data to the upward processor 113. To transmit data from the data link layer 36a to the respective slave processors, the provision 111 generates a provision signal to the downward driver 130. Then, the downward driver 130 shifts to a data receive mode. The downward processor 112 in the data receive mode outputs the data to be transmitted to the slave processors, to the downward driver 130. The downward driver 130 outputs the received data to the corresponding downward slave parts 131a to 131n. Upon receiving the data, the respective downward slave parts 131a to 131n records the data in the output area of the corresponding DPRAM. Through these procedures, the data are transmitted to the slave processors.

When the data is stored in the corresponding area of the DPRAM by the respective slave processors, the respective upward slave parts 141a to 141n read the recorded data from the DPRAM and output the read data to the upward driver 140. Then, the upward driver 140 collects the data output from the respective upward slave parts 141a to 141n and outputs the collected data to the upward processor 113 of the data link layer 36a.

Figure 5:
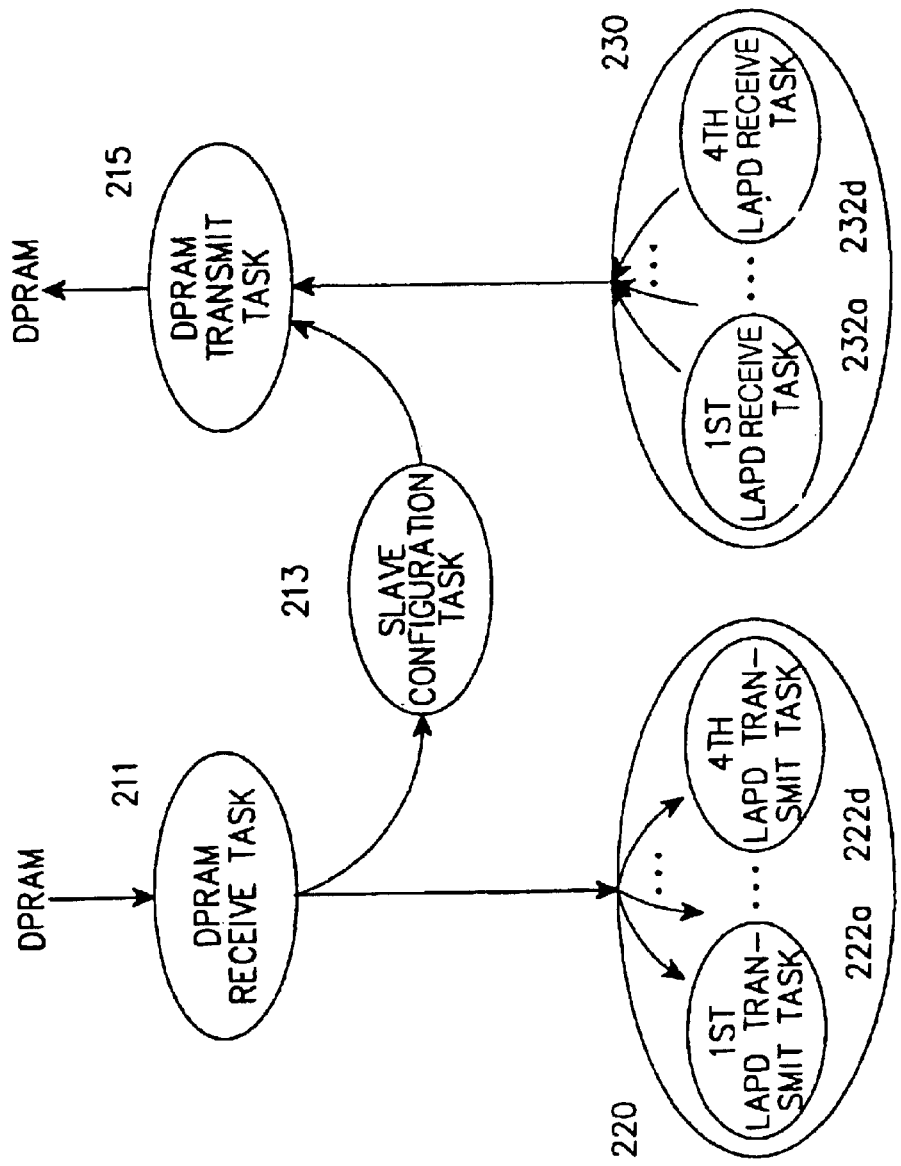
FIG. 5 is a schematic diagram illustrating the structure of software installed in the slave processors of the transmitter according to the present invention; and, FIG. 6 is a flow chart of signals communicated between the data channel processor and the slave processors during the initialization process according to the present invention.

FIG. 5 is an illustrative diagram of software installed in the slave processors of the transmitter according to the present invention. Now, a detailed description will be made with reference to FIG. 5 regarding the construction and the operation of the software installed in the slave processor.

A DPRAM receive task 211 reads the data from the DPRAM then deletes the read data from the DPRAM. The DPRAM receive task 211 outputs the read data to an LAPD transmit part 220 and generates a synchronizing signal to a slave configuration task 213. The slave configuration task 213 outputs the received synchronizing signal to a DPRAM transmit task 215 so that the DPRAM transmit task 215 can transmit the data synchronously. The LAPD transmit part 220 receives the data output from the DPRAM receive task 211 and divides the received data to corresponding LAPD transmit tasks, thereby outputting the data to the corresponding line. That is, the first to the fourth LAPD transmit tasks 222a to 222d transmit the data to other information processing equipment through the corresponding optical links, respectively. Meanwhile, the first to the fourth LAPD receive tasks 232a to 232d of an LAPD receive part 230 obtain the data through the optical links. Upon receiving the data from other information processing equipment through the optical links, the respective LAPD receive tasks 232a to 232d output the received data to the LAPD receive part 230. The LAPD receive part 230 collects the data received from the respective LAPD receive tasks 232a to 232d and outputs the data to the DPRAM transmit task 215. Upon receiving the data from the LAPD receive part 230, the DPRAM transmit task 215 records the data in the corresponding area of the DPRAM according to the synchronizing signal received from the slave configuration task 213. Through these procedures, the slave processor can perform data processing without the need of the OSI 7-layer protocol stack.

Figure 6:
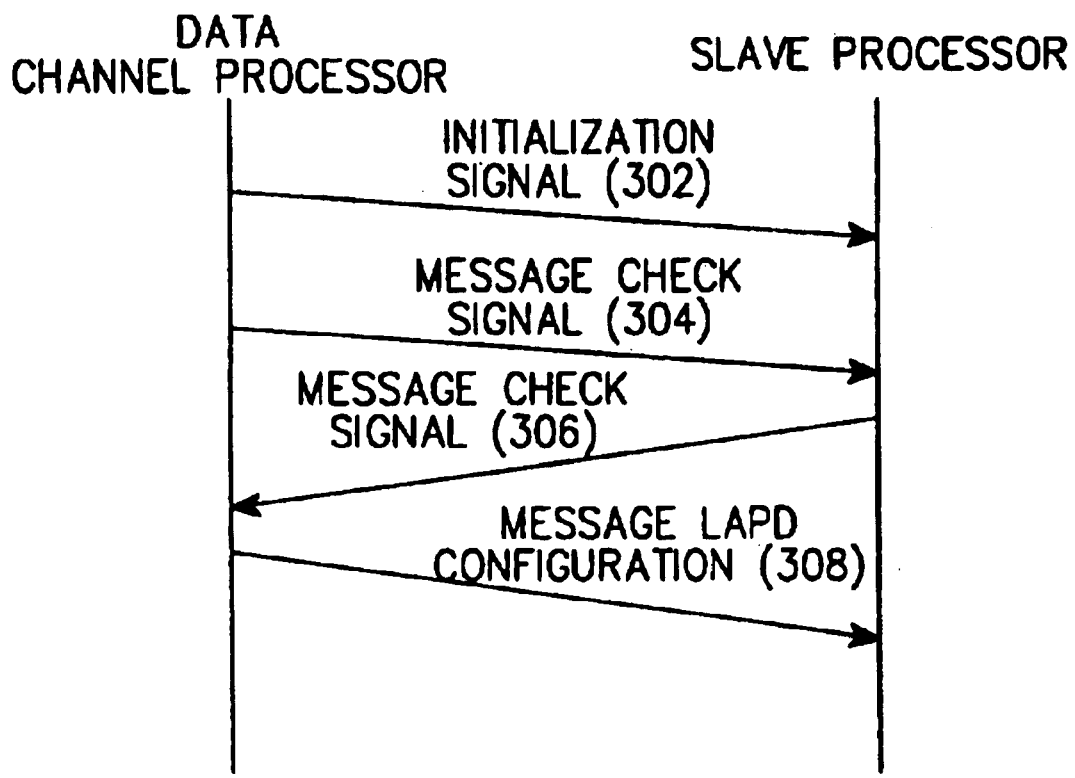

FIG. 6 is a flow chart of signals that are communicated between the data channel processor and the slave processor during the initialization process according to the present invention. Now, reference will be made in connection with FIG. 6 regarding the signal flow during the initialization of the data channel processor.

The data channel processor 11 selects a specific port of the slave processor among the ports of the slave processors belonging thereto and outputs an initialization signal MSG_LDCU_INIT, in step 302. That is, the data channel processor 11 selects specific one from the ports of a plurality of slave processors to output the initialization signal. The data channel processor 11 outputs a message check signal MSG_CHECK to the slave processor in step 304. Here, when the selected port is linked to the slave processor, the slave processor outputs the message check signal MSG_CHECK to the data channel processor 11 in step 306 in response to the received MSG_CHECK signal. Upon receiving the message check signal MSG_CHECK from the slave processor, the data channel processor 11 outputs a message LAPD configuration signal to the slave processor in step 308, notifying that the data channel processor is accessed and records the status of the slave processor in the configuration task of the data channel processor 11. As the selection of the slave processor and the initialization are completed, the flow of the process returns to step 302 to output the initialization signal to the ports connected to another slave processor. The above initialization procedure is performed for the initialization of the data channel processor 11, and can be provided to perform at every predetermined period in the event that the slave processor is not responsive to the initialization signal from the data channel processor 11. That is, the initialization procedure is generally performed when initializing the data channel processor. However, in the case that the initialization procedure is initiated and the slave processor is not ready for the initialization, a periodic initialization scheme can be adapted to assure the completion of the initialization process.

As described above, by providing the OSI 7-layer protocol stack only in the data channel processor of the transmitter, the present invention has advantage of decreasing the number of protocol stacks installed in the device constituting the transmitter and thereby lowering the total price of the transmission equipment. Moreover, the data is communicated between the data channel processor and the slave processors via the DPRAM or LAN so as to reduce the traffic of Ethernet. Furthermore, a decrease in the number of programs installed in the slave processors of the transmitter results in thereduction of the load on the system, and using less memory for the installation of the resident programs reduces the price of the transmitter.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data communication channel processing apparatus for a transmitter, said apparatus comprising:
    a data channel processor having a protocol stack for data communication with another transmitter;
    at least one slave processor without having a respective slave protocol stack for said at least one slave processor, said at least one slave processor being external to the data channel processor and having a driver for processing data received from or transmitted to the protocol stack of said data channel processor; and,
    a linking means for optically transmitting or receiving the data between said data channel processor and the externally connected slave processor according to said protocol stack,
    wherein said protocol stack includes Open System Interconnection (OSI) layers,
    and said protocol stack comprises:
        a data link layer of said OSI layers having a plurality of subnets for providing said data communication, wherein said first subnet executes said data communication in a first direction, said second subnet executes said data communication in a second direction, and the remainder of said subnets executes said data communication with said slave processor; and,
        a physical layer of said OSI layers having a first section and a second section, said first section corresponding to said first subnet and said second subnet of said data link layer for executing said data communication in said first direction and said second direction, respectively, and said second section corresponding to said remainder of said subnets of said data link layer for providing said data communication with said slave processor.

2. The data communication processor according to claim 1, wherein said linking means provides a communication link using a DPRAM.

3. The data communication processor according to claim 1, wherein said linking means provides a communication link using an Ethernet.

4. The data communication processor according to claim 1, wherein said data link layer comprises a downward processor for processing said data communication from said data channel processor to said slave processor, and an upward processor for processing said data communication from said slave processor to said data channel processor.

5. A computer-readable memory medium for storing computer-executable process steps in a data channel processor to process data between said data channel processor and a plurality of slave processors, wherein the medium includes an accessing step and a driving step, the computer-executable process steps comprising:
    said accessing step comprising:
        a generating step for outputting a provision signal prior to data transmission to said driving step to set said driving step in a receiving mode;
        a downward processing step that activates, maintains, and de-activates a physical connection for said data transmission to said slave processors; and,
        an upward processing step that activates, maintains, and de-activates the physical connection for said data transmission to said data channel processor;
    said driving step comprising:
        a transmitting step for transmitting the data to another data channel processor;
        a downward driving step for receiving the data from said downward processing step and for recording said received data in a Dual-Port Random Access Memory (DPRAM); and,
        an upward driving step for reading said recorded data from said DPRAM and outputting said read data to said upward processing step.

6. A computer-readable memory medium for storing computer-executable process steps in a plurality of slave processors coupled to other devices via a plurality of optical links to process data between a data channel processor and said slave processors, the computer-executable process steps comprising:

(1) an inputting step for reading the data transmitted from said data channel processor and stored in a Dual-Port Random Access Memory (DPRAM) during a downward processing mode;

(2) a distributing step for transmitting said read data from said DPRAM to corresponding said other devices during said downward processing mode;

(3) a collecting step for combining the data received from said other devices via said plurality of said optical links and for storing said combined data in said DPRAM during an upward processing mode;

(4) an outputting step for outputting said combined data stored in said DPRAM to transmit said combined data to said data channel processor during said upward processing mode; and, (5) a synchronizing step for matching configuration between said inputting step (1) and said outputting step (4) so that the execution of said outputting step (4) can perform synchronously with said inputting step (1).

7. The computer-readable memory medium according to claim 6, wherein said downward processing represents a step for processing the data from said data channel processor to said slave processor.

8. The computer-readable memory medium according to claim 6, wherein said upward processing represents a step for processing the data from said slave processor to said data channel processor.

9. The computer-readable memory medium according to claim 6, wherein said distributing step (2) comprises at least one LAPD transmit task and said collecting step (3) comprises at least one LAPD receive task.

10. A method for creating a shared protocol stack for providing data communication as set forth in the Open System Interconnection (OSI) layers between a data channel processor and at least one slave processor, wherein the at least one slave processor does not have a respective protocol stack and uses the protocol stack of the data channel processor, said protocol stack method comprising the following steps:

providing a data link layer of said OSI layers having a plurality of subnets for providing said data communication, wherein said first subnet executes said data communication in a first direction, said second subnet executes said data communication in a second direction, and the remainder of said subnets executes said data communication with said slave processor via a driver to operate the protocol stack of the data channel processor by said slave processor; and, providing a physical layer of said OSI layers having a first section and a second section, said first section corresponding to said first subnet and said second subnet of said data link layer for executing said data communication in said first direction and said second direction, respectively, and said second section corresponding to said remainder of said subnets of said data link layer for providing said data communication with said slave processor.

11. The protocol stack method according to claim 10, wherein said data communication is provided using a DPRAM.

12. The protocol stack method according to claim 10, wherein said data communication is provided using an Ethernet.

13. A method for executing the initialization process between a channel processor and a plurality of slave processors that do not have their own respective protocol stacks, wherein said data channel processor and said plurality of slave processors being externally connected over a transmission line, said method comprising the steps of:

transmitting, at the data channel processor, an initialization signal having a predetermined port address to one of said externally connected slave processors over a transmission line via a protocol stack located only in the data channel processor, wherein said protocol stack is shared with said plurality of slave processors;

outputting, at said data channel processor, a message check signal to said slave processors corresponding to said predetermined port address;

outputting, at the slave processors, a received message check signal to said data channel processor when said slave processor is linked to said data channel processor; and, outputting, at said data channel processor, a message LAPD configuration signal to the slave processors upon receiving said received message check signal.

* * * * *